(12) United States Patent
Sviberg

(10) Patent No.: US 10,532,641 B2
(45) Date of Patent: Jan. 14, 2020

(54) CONVERTIBLE TOP HAVING A MAIN LINK ABUTMENT ARRANGEMENT

(71) Applicant: Webasto SE, Stockdorf (DE)

(72) Inventor: Magnus Sviberg, Stockdorf (DE)

(73) Assignee: WEBASTO SE, Stockdorf (DE)

(*) Notice: Subject to any disclaimer, the term of this patent is extended or adjusted under 35 U.S.C. 154(b) by 0 days.

(21) Appl. No.: 15/873,247

(22) Filed: Jan. 17, 2018

(65) Prior Publication Data

US 2018/0201104 A1    Jul. 19, 2018

(30) Foreign Application Priority Data

Jan. 18, 2017   (DE) .................. 10 2017 100 893

(51) Int. Cl.
*B60J 7/12*    (2006.01)
*B60J 7/14*    (2006.01)
*B60J 7/20*    (2006.01)

(52) U.S. Cl.
CPC ............. *B60J 7/1204* (2013.01); *B60J 7/143* (2013.01); *B60J 7/20* (2013.01)

(58) Field of Classification Search
CPC ............. B60J 7/1204; B60J 7/143; B60J 7/20
See application file for complete search history.

(56) References Cited

U.S. PATENT DOCUMENTS

| 3,460,865 A | * | 8/1969 | Podwys | ................. B60J 7/1243 296/117 |
| 5,620,226 A | * | 4/1997 | Sautter, Jr. | ............. B60J 7/1265 296/107.08 |
| 2006/0038411 A1 | * | 2/2006 | Plesternings | .......... B60J 7/1851 292/144 |
| 2014/0300131 A1 | * | 10/2014 | Kopp | ..................... B60J 7/1856 296/116 |
| 2016/0318382 A1 | * | 11/2016 | Kopp | ..................... B60J 7/1856 |

FOREIGN PATENT DOCUMENTS

DE    102004005882 A1    10/2005
WO       2004035338 A1     4/2004

* cited by examiner

*Primary Examiner* — Lori L Lyjak
(74) *Attorney, Agent, or Firm* — Quarles & Brady LLP

(57) ABSTRACT

The invention relates to a convertible vehicle having a top linkage which can be displaced between a closed position and a storage position, and a linkage arrangement on both of its two sides relative to a vertical longitudinal center plane of the top. The linkage arrangement includes a main multi-joint arrangement pivotally mounted on a corresponding main bearing permanently mounted to the vehicle. The main multi-joint arrangement includes two main links, at least one of which rests against an abutment arrangement of the corresponding main bearing when in the closed position of the top so that the main bearing is in its a normal position. The abutment arrangement includes a displaceable abutment element which can be displaced between a rest position and an active position, in which the main link resting against the abutment arrangement is pivoted from the normal position to a deviated position.

4 Claims, 10 Drawing Sheets

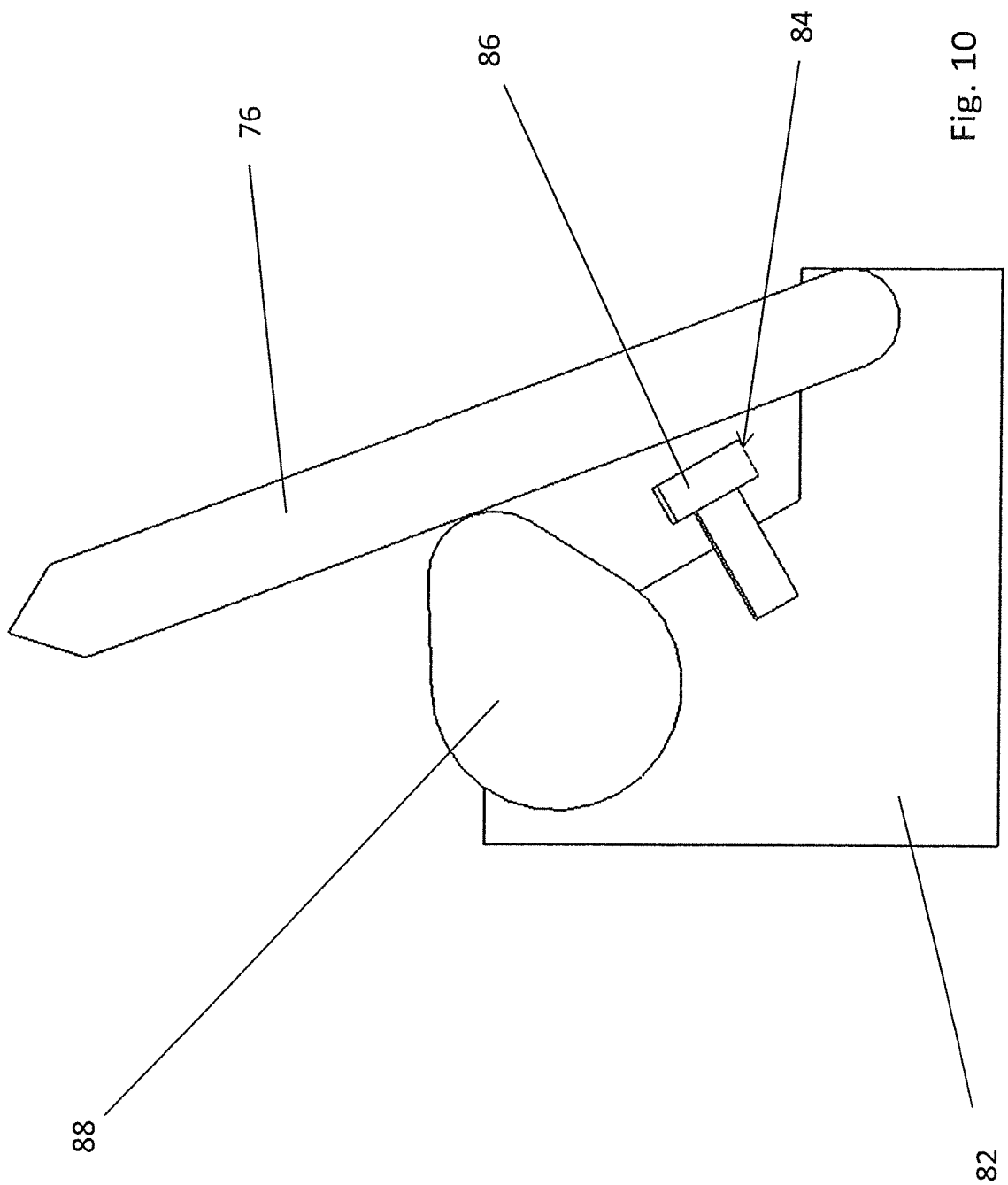

CONVERTIBLE TOP HAVING A MAIN LINK ABUTMENT ARRANGEMENT

CROSS-REFERENCE TO RELATED APPLICATIONS

This application claims priority to German Patent Application No. 10 2017 100 893.4 filed Jan. 18, 2017, which is incorporated herein by reference in its entirety.

BACKGROUND

The invention relates to a top of a convertible vehicle of the type that comprises a top linkage which comprises a linkage arrangement on both of its two sides relative to a vertical longitudinal central plane of the top.

Such a top is known from practice and is a displaceable vehicle roof which can be displaced between a closed position, in which a vehicle interior is spanned, and a storage position, in which the vehicle interior is released upward and the top is stored in a top storage space of the corresponding vehicle. The top can be realized as what is known as a retractable roof or RHT (retractable hardtop), which comprises rigid roof shells arranged flush behind each other when in the closed position, or as what is known as a folding roof, which comprises a flexible and foldable top cover spanned over the vehicle interior when in the closed position of the top. For actuation, i.e. for displacing the rigid roof shells or the top cover, the top comprises a top linkage in each instance, which comprises a linkage arrangement on both of its two sides relative to a vertical longitudinal center plane of the top, said linkage arrangement comprising a main multi-joint arrangement which is pivotally mounted on a main bearing mounted permanently to the vehicle. The main multi-joint arrangement generally comprises two main links, which are pivotally mounted on the main bearing and are connected to a roof link on the ends of the main multi-joint arrangement facing away from the main bearing. In the top's closed position, at least one of the main links rests against an abutment mounted permanently to the main bearing so that the end position of the corresponding linkage arrangement is unambiguously defined. The abutment position is the normal position of the top linkage.

In a top realized as a RHT3 having three rigid roof shells, the rigid roof shells are first pivoted against each other starting from the closed position, the main link arrangement remaining in its normal position, i.e. one of the main links rests against the abutment mounted permanently to the main bearing. The top can sway or teeter in a vertical direction in particular in a driving situation or even a dangerous situation, such as an accident, due to the present tolerances and elasticities of the top components. Hence, the danger of the top getting into passengers' head space exists in a situation in which the top is displaced while the vehicle is moving, which in turn can impair passengers.

Accordingly, a front bow or a different component can get into the head space in specific driving situations while displacing the folding top, e.g. in an intermediate position, and impair passengers' headroom.

SUMMARY

The object of the invention is to create a top of the make mentioned above with which the danger of impairing passengers' headroom in an intermediate position is minimized while displacing the top between the closed position and the opening position.

According to the invention, it is proposed that the abutment arrangement comprises a displaceable abutment element for one of the main links, said abutment element being able to be displaced between a rest position and an active position, in which the main link resting against the abutment arrangement is pivoted from its normal position to a deviated position. This leads to all components of the top arranged in front of the main link arrangement in the direction of the vehicle front being raised in comparison to the their position when the main link is in its normal position. Through this, it is attained that the headroom for passengers is expanded which in turn decreases the danger of impairing the passengers when displacing the top while driving. When in the active position, the displaceable abutment element therefore keeps the corresponding main link from its end position, which corresponds to its normal position. The danger that the top will sway or teeter into the passengers' headspace is consequently decreased. By using the top according to the invention, the passengers' safety can therefore be increased with respect to known tops. Furthermore, the allowable maximum speed for displacing the top while driving the corresponding vehicle can be increased, if necessary, via the displaceable abutment element.

In a special embodiment of the top according to the invention, the displaceable abutment element is displaced to the active position with each displacement procedure or alternatively with every displacement procedure while driving the corresponding vehicle, said displaceable abutment element having to be moved to the rest position when at least in the closed position of the top in order to enable impeccably setting the top at a front wind cowl of the respective vehicle.

In an alternative embodiment of the top according to the invention, the displaceable abutment element is activated, i.e. it is displaced from the rest position to the active position, during a dangerous situation which can be detected by means of a driving-condition detection device of the corresponding vehicle. Thus, the abutment arrangement can, for example, be connected to an accident detection sensor of the corresponding vehicle, which detects the dangerous situation at an early stage.

Preferably, the main links arranged on both sides and resting against the displaceable abutment elements when in the deviated position are pivoted approximately 2° to 10° with respect to the normal position.

The displaceable abutment arrangement provides a particularly effective protection for passengers when it forms a rigid and inflexible abutment for the respective main link.

The displaceable abutment arrangement is formed, for example, by an eccentric cam which can be pivoted between the rest position and the active position and forms a rigid abutment for the corresponding main link when in the active position.

In an alternative embodiment of the top according to the invention, the displaceable abutment arrangement is a pin having a piezoelectrically functioning displacement element, which forms a rigid abutment for the main link when in its active position. Applying electricity to the piezoelectrically functioning displacement element leads to its elongation and thus to the pin being moved from its rest position to its active position.

Further advantages and advantageous embodiments of the subject matter of the invention can be derived from the description, the drawing and the claims.

BRIEF DESCRIPTION OF THE DRAWINGS

Exemplary embodiments of a top according to the invention are illustrated in a schematically simplified manner in the drawing and are further described in the following description. In the drawing.

FIG. 10 illustrates the abutment arrangement according to FIG. 9 having the abutment element in the active position.

DETAILED DESCRIPTION

Figure 1:
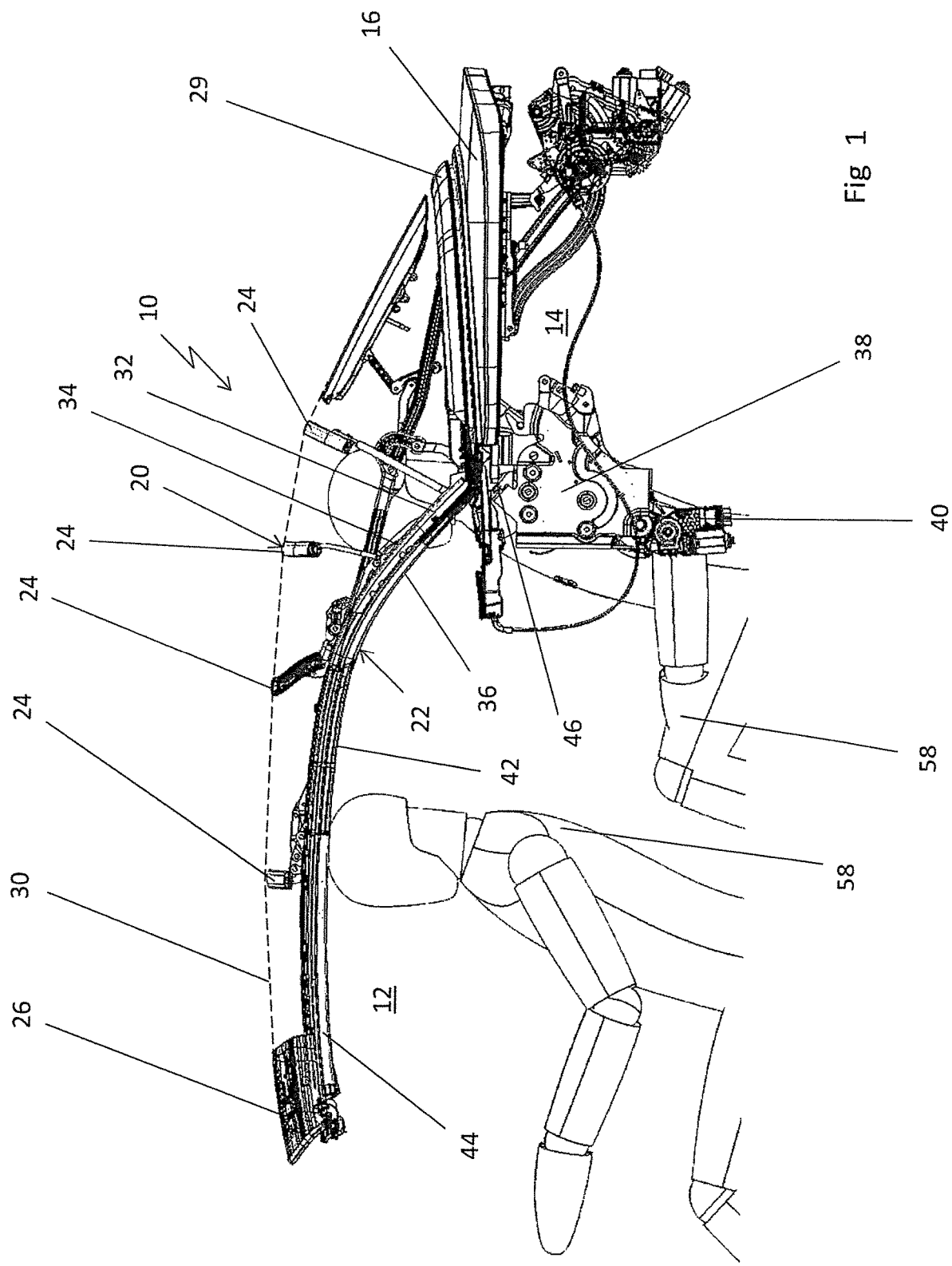
FIG. 1 illustrates a top according to the invention realized as a folding top when in its closed position.
Figure 2:
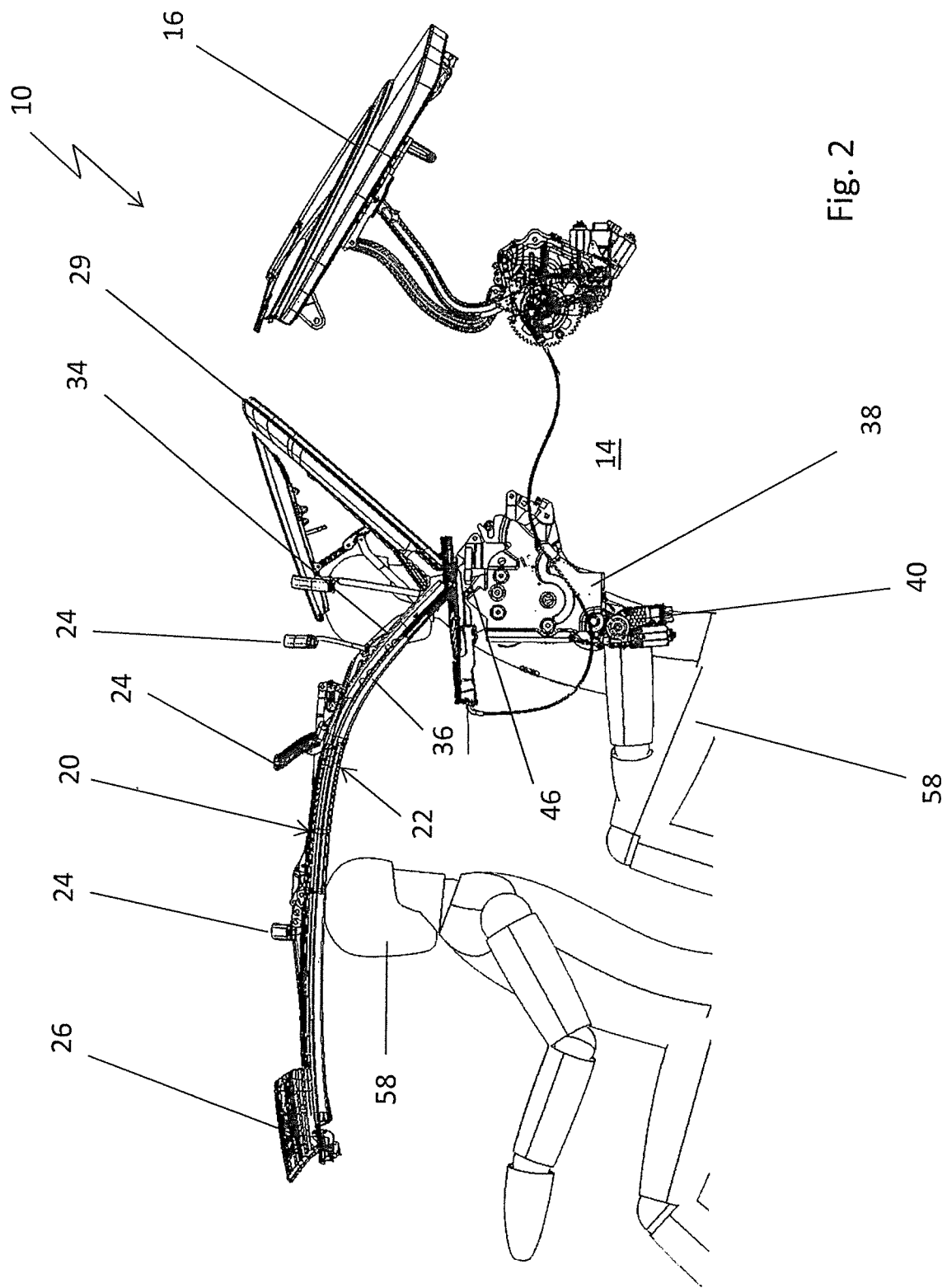
FIG. 2 illustrates the top according to FIG. 1 when in an intermediate position.
Figure 3:
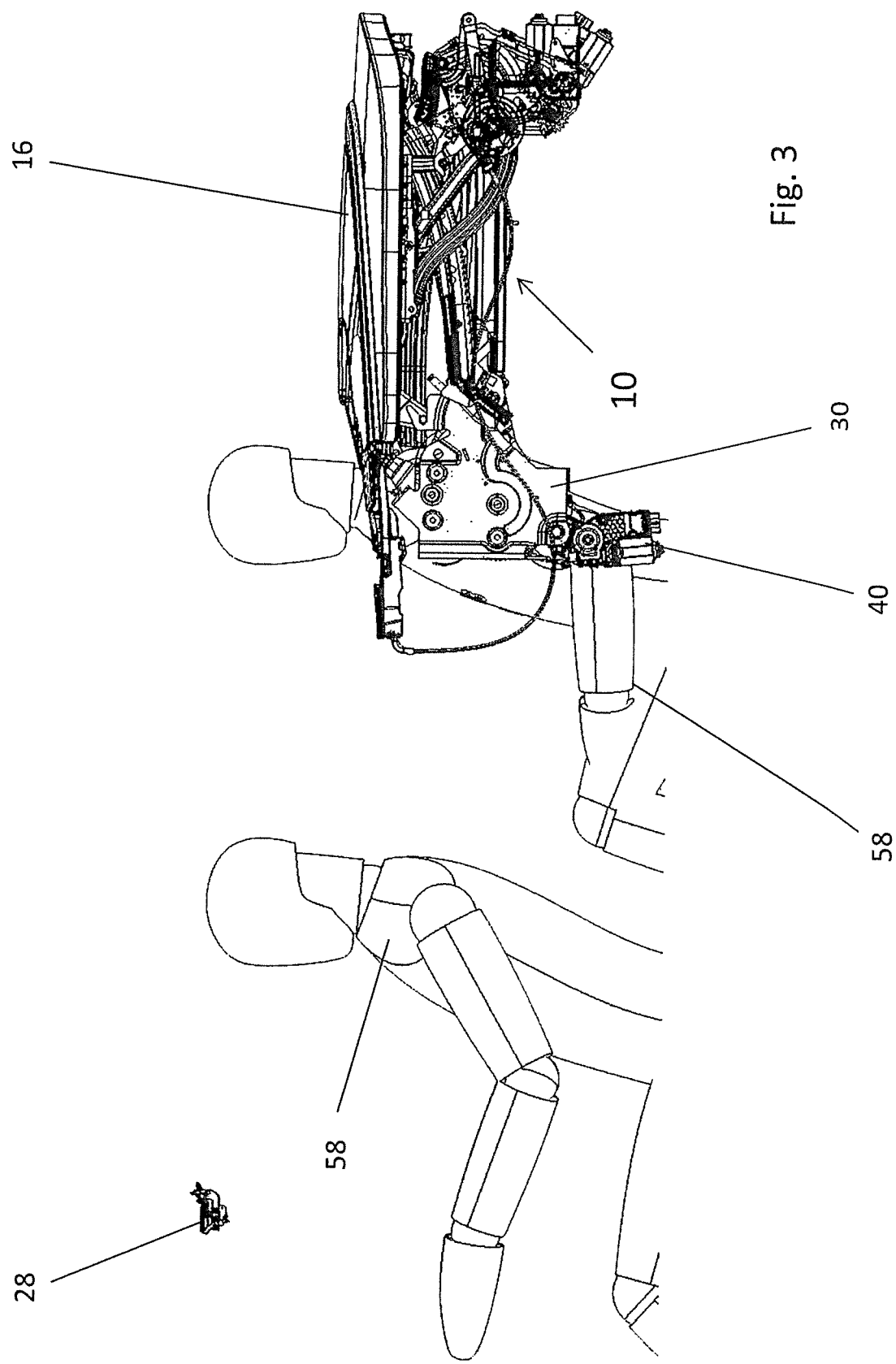
FIG. 3 illustrates the top when in its storage position.

In FIGS. 1 to 3, a top 10 of a convertible vehicle realized as a folding top is illustrated. The top 10 can be displaced from a closed position illustrated in FIG. 1, in which it spans a vehicle interior 12, to a storage position illustrated in FIG. 3 via an intermediate position illustrated in FIG. 2, said top 10 being arranged in a rearward top storage space 14 when in said storage position, which can be closed by means of a top storage space cover 16.

The top 10 comprises a top linkage 20 which each comprise a linkage arrangement 22 on both of its two sides relative to a vertical longitudinal central plane of the top. Transverse bows 24 as well as one front bow 26, via which the top 10 is set at a front wind cowl 28 mounted permanently to the vehicle when in its closed position illustrated in FIG. 1 by means of a corresponding lock arrangement, extend between the linkage arrangements arranged on both of its two sides and formed mirror-symmetrically to each other. Moreover, the top linkage 20 comprises a rearward tensioning bow 29 which forms the rearward edge of the top when in the closed position and also connects the linkage arrangements 22 arranged on both of its two sides to each other. A top cover 30 for spanning the vehicle interior 12 can be spanned by means of the top linkage 20.

The linkage arrangements 22 arranged on both sides each comprise a main multi-joint arrangement 32 which comprises a first main link 34 and a main column 36 representing a second main link. The main link 34 and the main column 36 are pivotally mounted on a shared main bearing 38 and can be displaced by means of a drive motor 40. At their ends facing away from the main bearing 38, the main column 36 and the main bearing 34 are connected to a middle roof link 42, which in turn is connected to a frontal link 44 via a link arrangement not further illustrated.

In the closed position illustrated in FIG. 1, the main column 36 rests against an abutment arrangement 46 formed on the main bearing 38.

Figure 5:
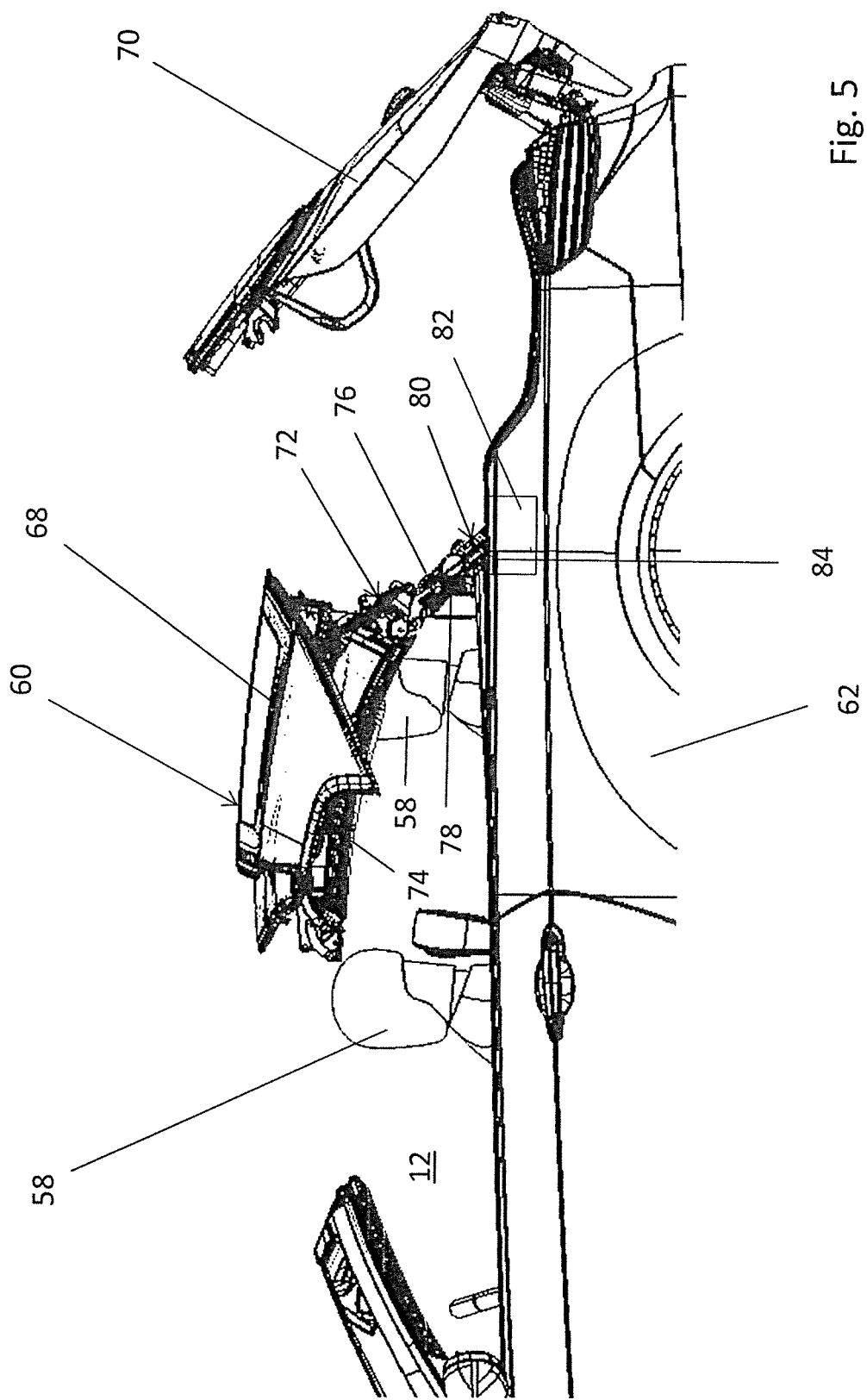
FIG. 5 illustrates the vehicle according to FIG. 4 for an intermediate position of the top.
Figure 6:
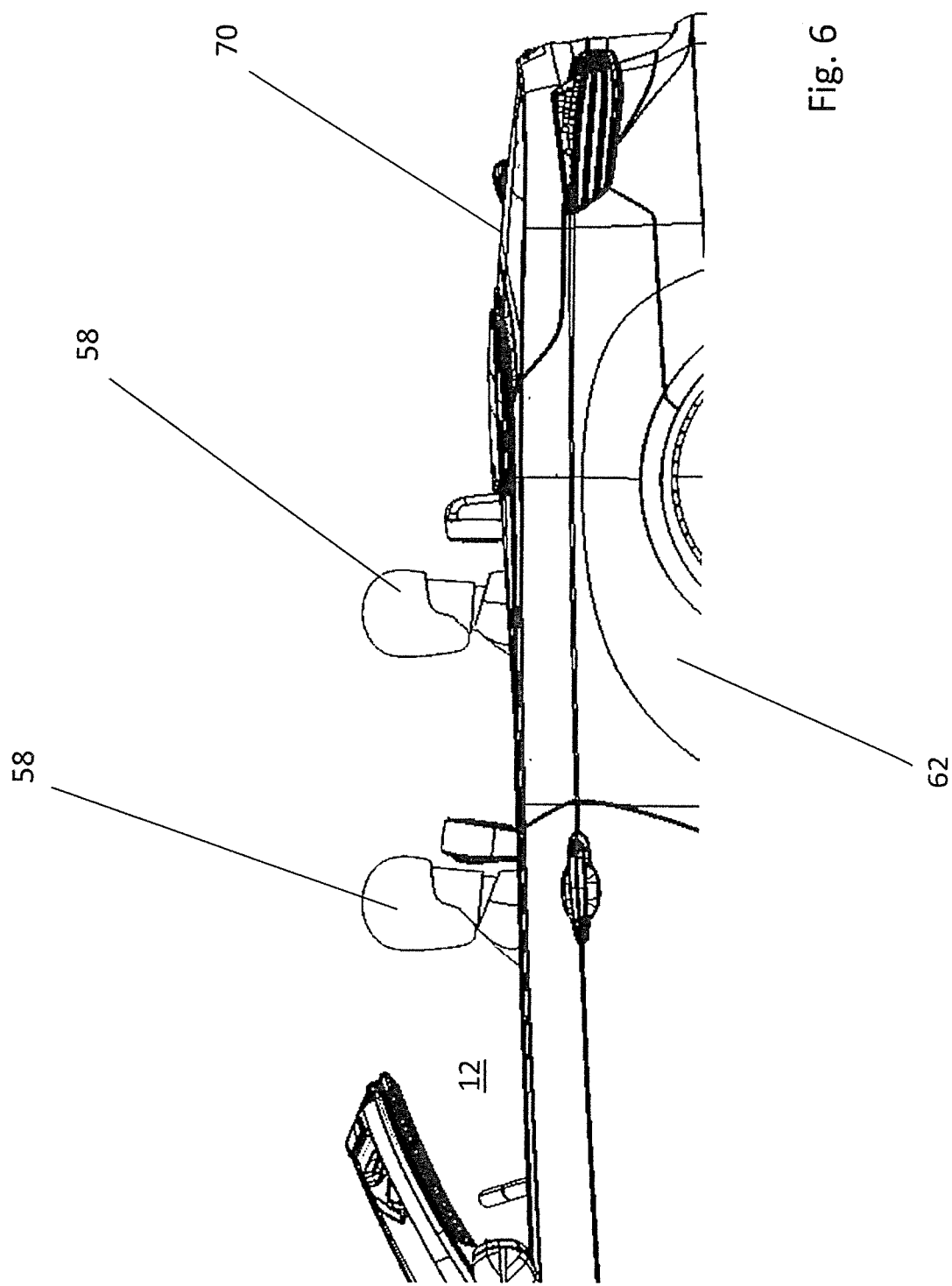
FIG. 6 illustrates the vehicle according to FIG. 4 for a storage position of the top.
Figure 7:
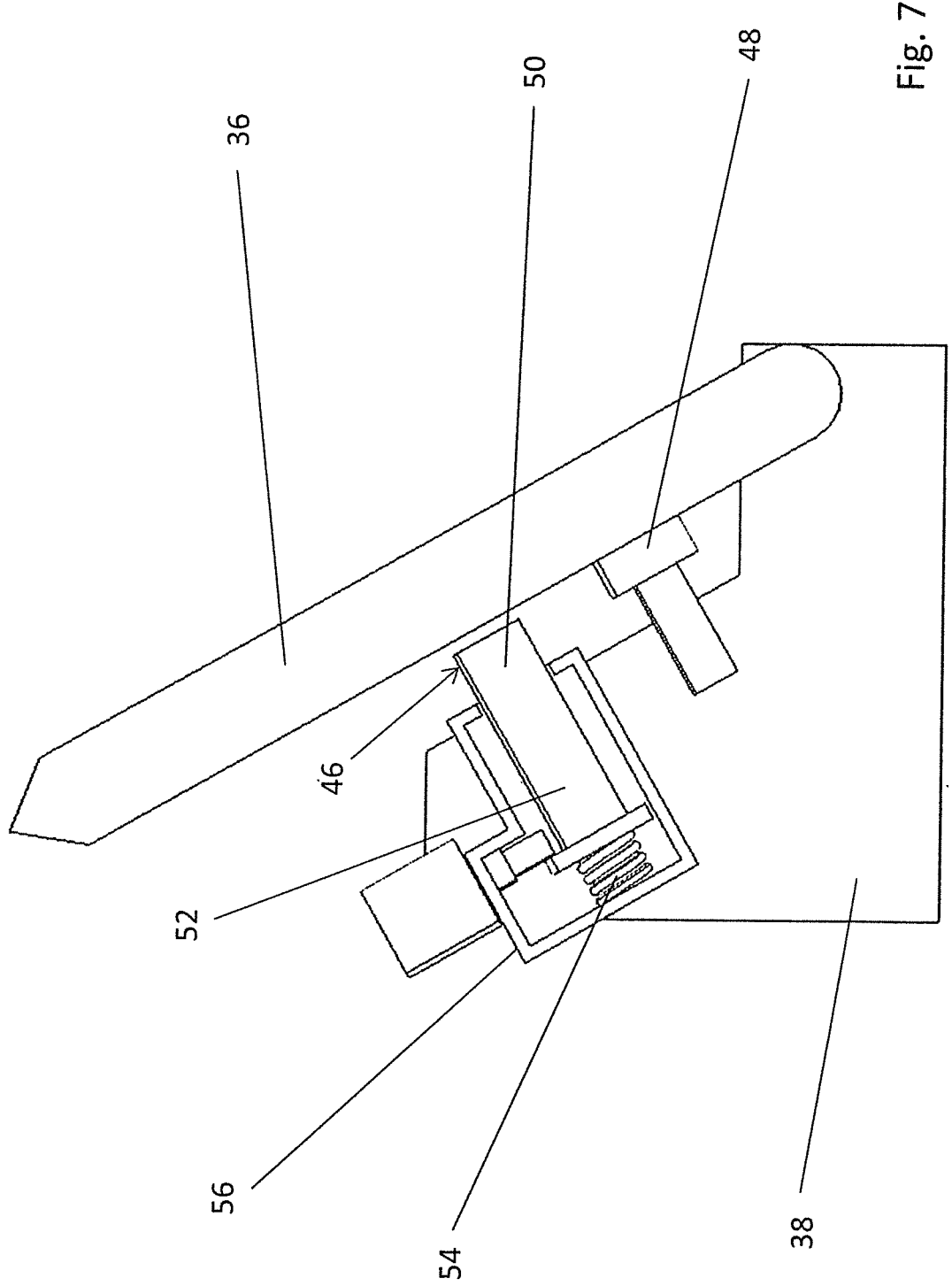
FIG. 7 illustrates an abutment arrangement for a main link of the top according to FIGS. 1 to 6 having an abutment element in the rest position.
Figure 8:
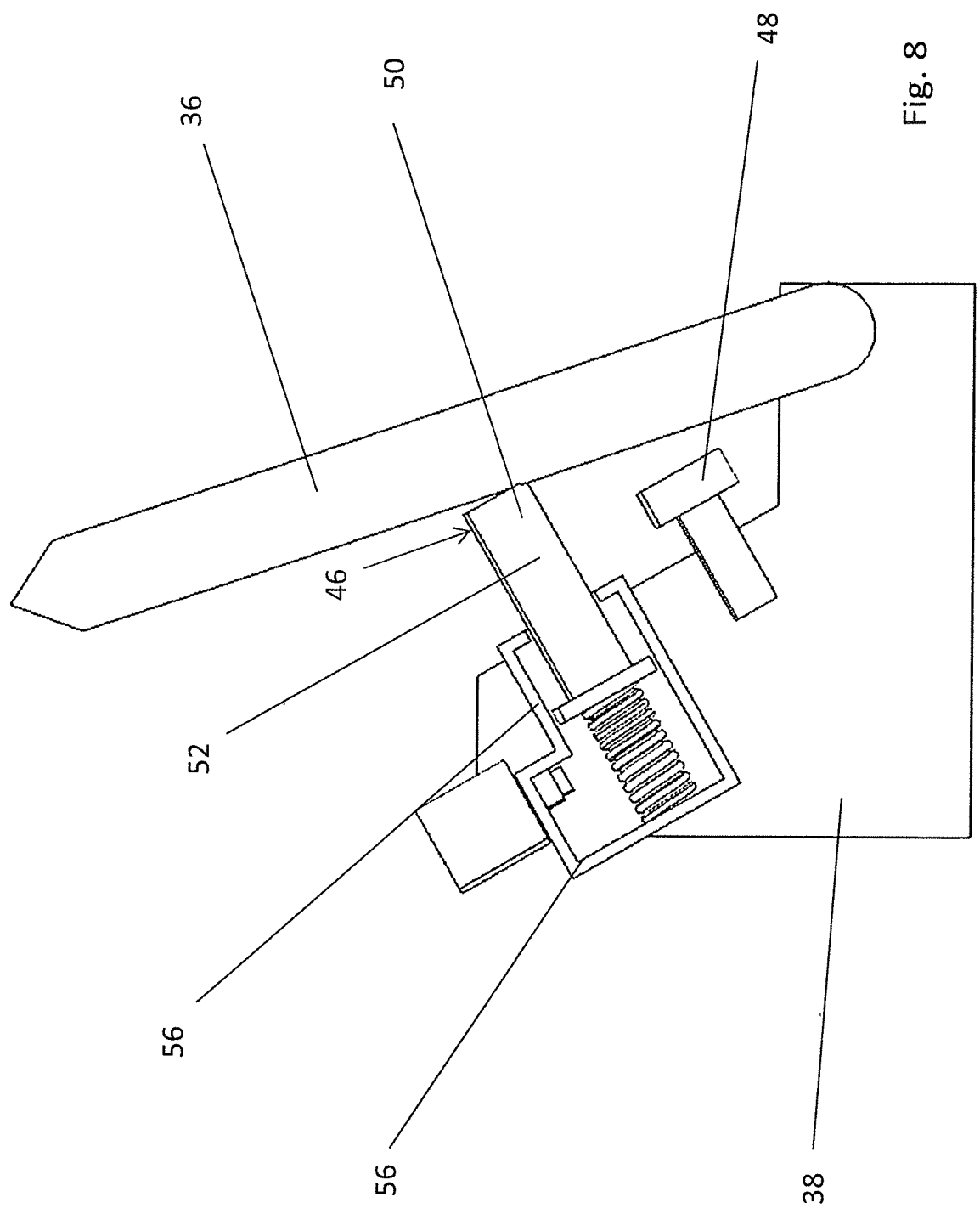
FIG. 8 illustrates the abutment arrangement according to FIG. 7 with the abutment element in the active position.

The abutment arrangement 46, which is schematically illustrated in detail in FIGS. 7 and 8, comprises an abutment element 48, which is mounted permanently to the main bearing and against which the main column 36 rests when in the closed position illustrated in FIGS. 1 to 7. Furthermore, the abutment arrangement 46 comprises a displaceable abutment element 50, which is made of a pin 52 and comprises a piezoelectrically functioning displacement element 54 so that the pin 52 can be displaced from the rest position illustrated in FIG. 7 to an active position illustrated in FIG. 8, in which the pin 52 is moved out of a casing 56 and forms an abutment for the main column 36. By the abutment element 50 being displaced to its active position, the main column 36 is pivoted to its deviated position with respect to the normal position illustrated in FIG. 7 by approximately 5° to 8°. This deviated position is the position of the main column 36 if the front bow 26 is unlatched from the front wind cowl 28. When opening the top 10, the front latch is first moved to its releasing position and then the displacement movements of the top linkage 20 are initiated by means of the drive motors 40, the abutment arrangement 46 being moved to its active position by displacing the displaceable abutment element 50 and the main column 36 being pivoted from the normal position to the deviated position. In this manner, the passengers can be additionally effectively protected when displacing the top linkage 20 since the passengers' headroom is not impaired by the swaying of the top linkage 20. Only when the top 10 is moved from its storage position to its closed position will the displaceable abutment element 50 be moved to its rest position again, whereby the front bow 26 can be secured to the front wind cowl 28.

Figure 4:
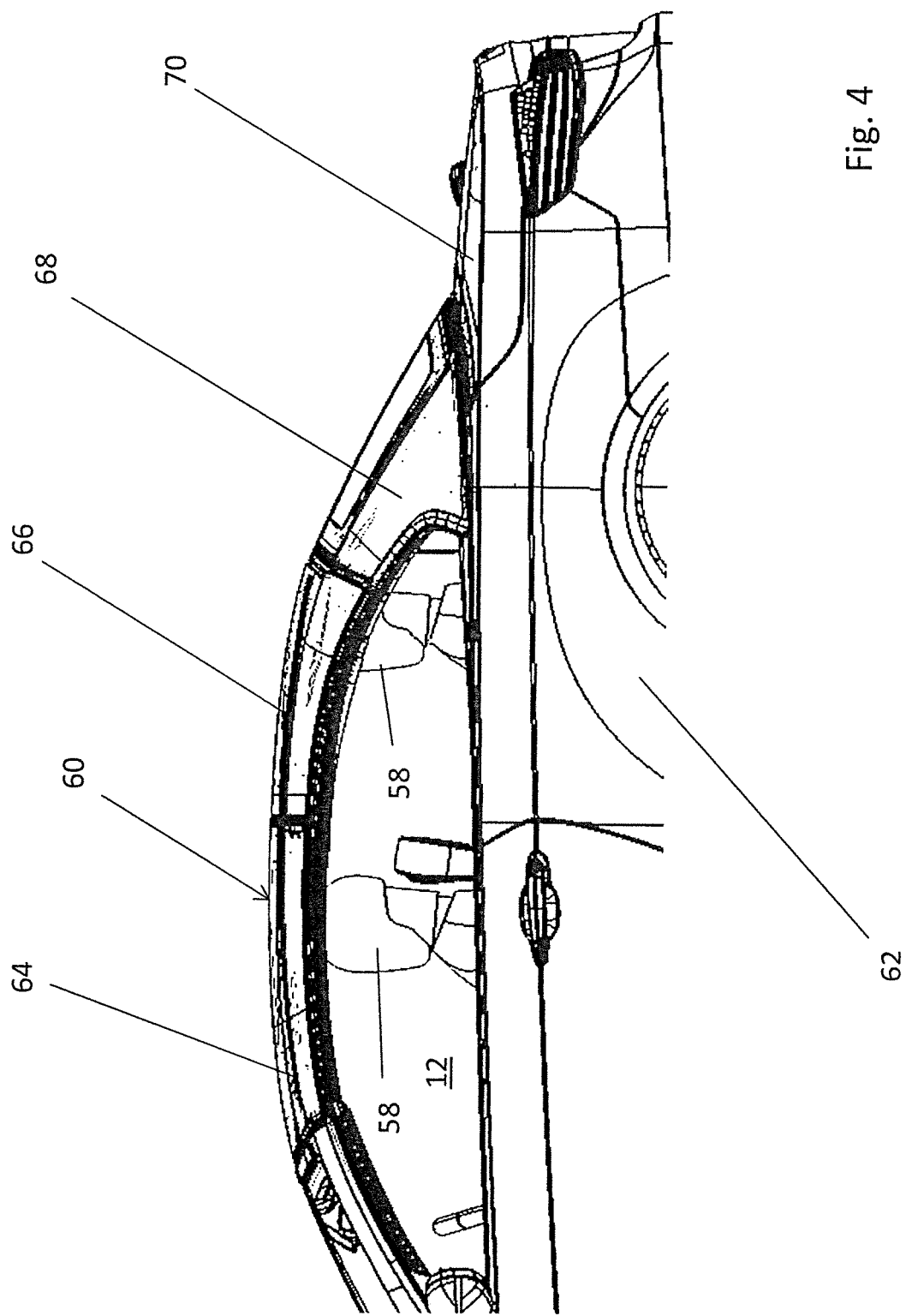
FIG. 4 illustrates sections of a vehicle having a top realized as a retractable top according to the invention.

In FIGS. 4 to 6, a retractable top 60 having three shells of a vehicle 62 realized as a convertible vehicle is illustrated. The top 60 consequently comprises three rigid roof shells 64, 66 and 68, which are aligned flush behind each other when in the closed position illustrated in FIG. 4 and which are received when stacked on top of each other by a rearward top storage space of the vehicle 62 when in the storage position illustrated in FIG. 6. The top compartment can be closed by means of a top storage space cover 70.

For displacing the rigid roof shells 64, 66 and 68 between the closed position illustrated in FIG. 4 and the storage position illustrated in FIG. 6, the top 60 comprises a top linkage 72 which comprises a linkage arrangement 74 on each of its two sides relative to a vertical longitudinal center plane of the top in each instance. The rigid roof shells 64, 66 and 68 are mounted on the linkage arrangements 74 arranged on both sides.

The linkage arrangements 74 arranged on both sides are arranged in a mirror-symmetrical manner relative to the vertical longitudinal center plane of the top, for which reason the linkage arrangement 74 arranged on the left side of the vehicle 62 with respect to the frontward driving direction is primarily described at present. The linkage arrangement arranged on the right side with respect to the frontward driving direction can be derived analogously from the description.

The linkage arrangements 74 each comprise two main links 76 and 78, which are allocated to a main multi-joint arrangement 80 and are pivotally mounted on a shared main bearing 82 mounted permanently to the vehicle. When in the closed position illustrated in FIG. 4 and when displacing the roof shells 64 and 68 with respect to the roof shell 66, the main link 76 rests against an abutment arrangement 84 which is formed on the main bearing 82. The abutment arrangement 84 comprises a rigid abutment element 86 as well as a displaceable abutment element 88 which is made of a rotatable eccentric cam. For displacement, the displaceable abutment element 88 is provided with, for example, an electric drive motor not further illustrated in this instance.

Figure 9:
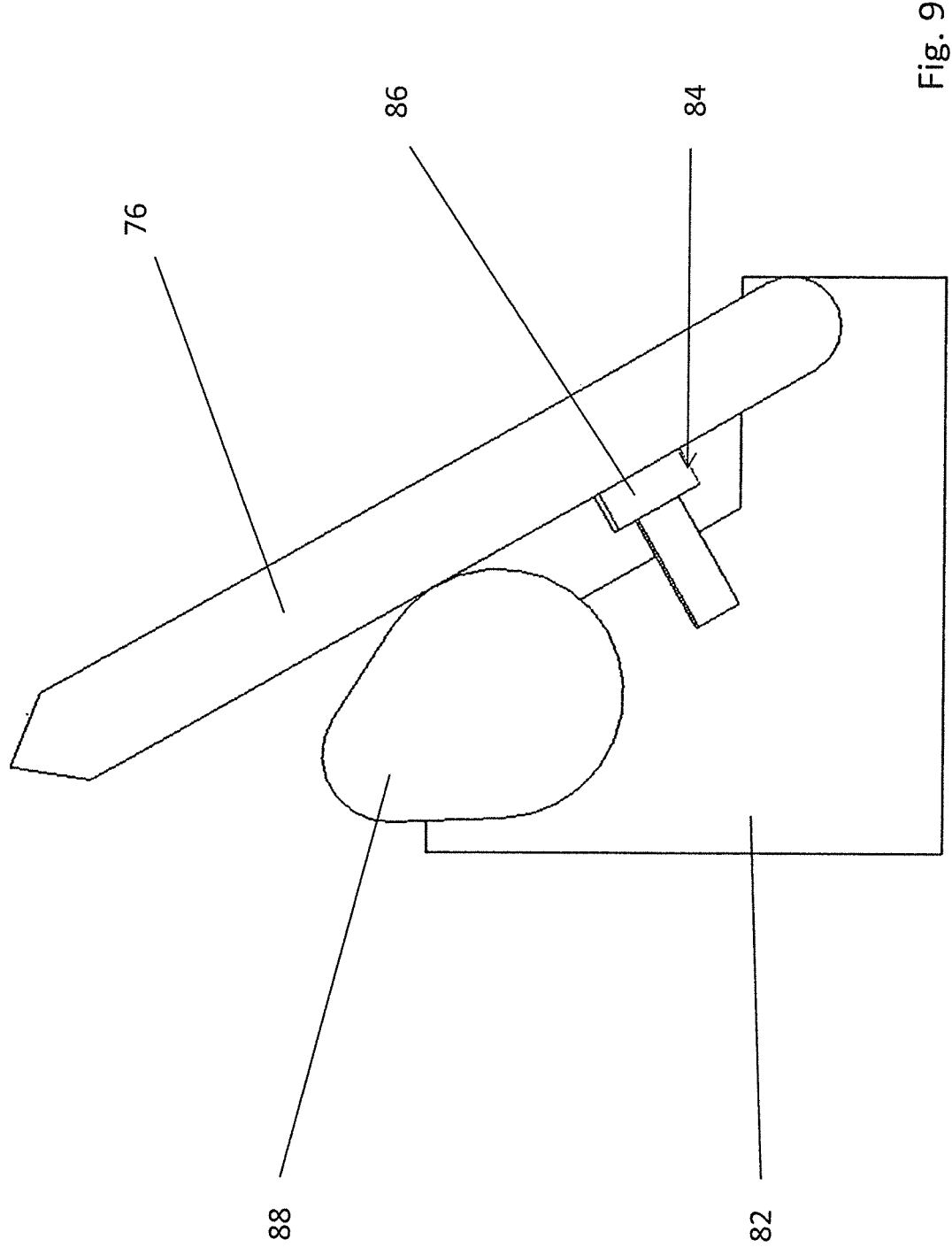
FIG. 9 illustrates an alternative embodiment of an abutment arrangement having an abutment element in the rest position.

The displaceable abutment element 88 can be displaced from a rest position illustrated in FIG. 9 to an active position illustrated in FIG. 10, in which the main link 76 resting against the abutment arrangement 84 is pivoted from the normal position illustrated in FIG. 9 by approximately 5° to 8° to a deviated position. Consequently, the stacked arrangement of the rigid roof shells 64, 66 and 68, as seen in the intermediate position in FIG. 5, is raised, whereby the danger of the top 10 dipping into passengers' 58 headspace is minimized. The abutment arrangement 84 is connected to an accident detection system of the vehicle 62 so that the displaceable abutment element 88 is moved to an intermediate position of the top 60 for raising the top 60 to the active position illustrated in FIG. 10 when detecting an accident or the danger of an accident. The abutment arrangement 84 can be used in the top illustrated in FIGS. 1 to 3 instead of the abutment arrangement 46. Accordingly, the abutment arrangement 46 according to FIGS. 7 and 8 can be used in the top according to FIGS. 4 and 6 instead of the abutment arrangement 84.

LIST OF REFERENCES

10 top
12 vehicle interior
14 top storage space
16 top storage space cover
20 top linkage
22 linkage arrangement
24 transverse bow
26 front bow
28 front wind cowl
29 tensioning bow
30 top cover
32 main multi-joint
34 main link
36 main column
38 main bearing
40 drive motor
42 middle roof link
44 front link
46 abutment arrangement
48 abutment element
50 displaceable abutment element
52 pin
54 displacement element
56 casing
58 passenger
60 top
62 vehicle
64 roof shell
66 roof shell
68 roof shell
70 top storage space cover
72 top linkage
74 linkage arrangement
76 main link
78 main link
80 main multi-joint arrangement
82 main bearing
84 abutment arrangement
86 abutment element
88 displaceable abutment element

The invention claimed is:

1. A convertible vehicle, comprising:
a top linkage, which can be displaced between a closed position, in which the top spans a vehicle interior, and a storage position, in which the vehicle interior is released upward and the top is stored in a top storage space of the corresponding vehicle, the top linkage comprising a linkage arrangement on both of a first side and an opposing second side of the linkage arrangement relative to a vertical longitudinal center plane of the top, said linkage arrangement comprising a main multi-joint arrangement pivotally mounted on a corresponding main bearing permanently mounted to the vehicle, said main multi joint arrangement comprising two main links, at least one of which rests against an abutment arrangement of the corresponding main bearing when in the closed position of the top so that the main bearing is in its normal position, wherein the abutment arrangement comprises a displaceable abutment element which can be displaced between a rest position and an active position, in which the main link resting against the abutment arrangement is pivoted from the normal position to a deviated position.

2. A top according to claim 1, wherein the main link is pivoted approximately 2° to 10° when in the deviated position with respect to the normal position.

3. The top according to claim 1, wherein the abutment element is an eccentric cam which can be pivoted to the active position and forms a rigid abutment for the main link when in said active position.

4. The top according to claim 1, wherein the abutment element comprises a pin having a piezoelectrically functioning displacement element which forms a rigid abutment for the main link when in the active position.

* * * * *